US006501998B1

(12) United States Patent
Pfeiffer

(10) Patent No.: US 6,501,998 B1
(45) Date of Patent: Dec. 31, 2002

(54) METHOD FOR CONTROLLING A TIME-LAGGED PROCESS WITH COMPENSATION, AND A CONTROLLING DEVICE FOR CARRYING OUT SAID METHOD

(75) Inventor: Bernd-Markus Pfeiffer, Karlsruhe (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/424,808

(22) PCT Filed: May 22, 1998

(86) PCT No.: PCT/DE98/01411

§ 371 (c)(1),
(2), (4) Date: Apr. 3, 2000

(87) PCT Pub. No.: WO98/54628

PCT Pub. Date: Dec. 3, 1998

(30) Foreign Application Priority Data

May 28, 1997 (DE) .......................................... 197 22 431

(51) Int. Cl.[7] .............................................. G05B 13/02
(52) U.S. Cl. ............................. 700/37; 700/31; 700/41; 700/42
(58) Field of Search .............................. 700/37, 31, 41, 700/42

(56) References Cited

U.S. PATENT DOCUMENTS

| 4,358,822 A | * | 11/1982 | Sanchez ...................... 700/31 |
| 4,639,853 A | | 1/1987 | Rake et al. |
| 4,768,143 A | * | 8/1988 | Lane et al. .................... 700/37 |
| 4,882,526 A | * | 11/1989 | Iino et al. .................... 318/561 |
| 4,975,827 A | * | 12/1990 | Yonezawa .................... 700/31 |
| 5,121,332 A | * | 6/1992 | Balakrishnan et al. ........ 700/37 |
| 5,166,873 A | * | 11/1992 | Takatsu et al. ................ 700/31 |
| 5,260,865 A | * | 11/1993 | Beauford et al. ............. 700/31 |

(List continued on next page.)

FOREIGN PATENT DOCUMENTS

| DE | 28 18 270 | 8/1984 |
| DE | 39 29 615 | 3/1991 |
| DE | 41 20 796 | 1/1993 |
| DE | 43 20 900 | 9/1994 |
| DE | 195 16 402 | 1/1996 |
| DE | 295 13 152 | 10/1996 |
| DE | 295 13 251 | 11/1996 |
| DE | 195 25 066 | 1/1997 |
| DE | 195 48 909 | 7/1997 |
| EP | 0 379 215 | 7/1990 |
| EP | 0 520 233 | 12/1992 |
| EP | 0 692 752 | 1/1996 |

OTHER PUBLICATIONS

P. Rieger et al., Ermittlung von Modellparametern durch nichtlineare Optimierung im CAE–System PROMAR für Mikrorechnerregler S 2000–R, msr. Berlin 33 (1990) 8, pp. 372–375**.

S. Al–Assadi et al., "Computer–aided optimisation of simplified discrete models for control systems", Transactions of the Institute of Measurement and Control, vol. 11, No. 3, Jul.–Sep. 1989, pp. 138–144.

H. Unbehauen, Regelungstechnik I, Vieweg*** No Date.

*Primary Examiner*—Thomas Black
*Assistant Examiner*—Thomas Pham
(74) *Attorney, Agent, or Firm*—Staas & Halsey LLP

(57) ABSTRACT

A method is described for the closed-loop control of a time-delayed process having compensation, in particular for temperature control. After a setpoint value step-change, the manipulated variable is set at a first constant value in an open-loop controlled operation, an IT1 model is identified on the basis of the step-change response and a PI controller is parametrized, which closed-loop controls the process into a second steady state. Subsequently, a more exact process model having compensation is determined and is used for the control adjustment.

12 Claims, 1 Drawing Sheet

U.S. PATENT DOCUMENTS 5,394,322 A * 2/1995 Hansen .................. 700/37
5,402,333 A     3/1995 Cardner
5,486,995 A * 1/1996 Krist et al. ............. 700/29
5,537,310 A * 7/1996 Tanake et al. .......... 700/31
5,847,952 A * 12/1998 Samad ................. 700/37
5,892,679 A *  4/1999 He ..................... 700/37
6,128,586 A * 10/2000 Pfeiffer ............... 700/37

* cited by examiner

METHOD FOR CONTROLLING A TIME-LAGGED PROCESS WITH COMPENSATION, AND A CONTROLLING DEVICE FOR CARRYING OUT SAID METHOD

FIELD OF THE INVENTION

The present invention relates to a method for the closed-loop control of a time-delayed process having compensation, in particular for temperature control, as well as a control device for carrying out the method.

BACKGROUND INFORMATION

An adaptive controller for time-delayed processes having compensation is described in German Patent No. 39 29 615. The controller has the capacity to adjust its parameters autonomously to the characteristics, changing over time, of a controlled system. For this purpose, the response of the process to a step-like shift of the setpoint value is recorded and, in an iterative method, a PTn model is sought, using the Ptn model, this step-response can be simulated with the greatest possible accuracy. The PTn model is viewed as optimal if the error, calculated according to the method of the least error squares, between the step-responses of the PTn model and the real process is minimal. After the process identification is concluded, a controller is designed in accordance with the absolute-value optimum on the basis of the process model established. In German Patent No. 39 29 615, consideration is given to single-loop closed-loop control circuits having controllers of the PID type. The processes to be controlled demonstrate a method having compensation, i.e., they represent a controlled system in which the step-response flows into a new steady state.

A disadvantage of this method is that when the conventional adaptive controller is placed into operation, an often time-consuming step-change test must be carried out before the controller can be optimized. Also disadvantageous are the creeping time constants, i.e., poles that are located very close to the origin of the Laplace plane and which lead to an integrator-like behavior of the process, so that after a manipulated-variable step-change, no steady state can be achieved for a long time.

In the German Patent Application No. 195 48 909.8, a method for closed-loop controlling a time-delayed process having compensation is described along with a control device for carrying out the method, in which, when a controller is placed into operation, the time-consuming step-change test can be dispensed with. In this context, however, it is disadvantageous that storage of the measuring data and a time-discrete parameter estimator, which uses a cumbersome calculation method, are necessary.

SUMMARY

An object of the present invention is to provide a method for the closed-loop control of a time-delayed process having compensation, in particular for temperature control, using which the above-mentioned disadvantages are avoided. Another object of the present invention is to provide a control device for carrying out the method.

To achieve this objective, the new method of the type mentioned above has the features indicated in the characterizing part of Claim 1. Refinements of the method are described in Claims 2 through 7. A control device having the features mentioned in Claim 8 is suited for carrying out the method.

An advantage of the present invention is that when placing a controller into operation, a time-consuming step-change test can be completely dispensed with. During the first phase of an adjustment procedure in accordance with a setpoint value step-change, a simple IT1 model approximates the process, and the first setpoint value can be started in a manner that is virtually time-optimal and without overshooting. This has a particular advantageous effect in the closed-loop control of temperatures at a specified setpoint value using an adjustable heating system, in which a controller is to maintain the temperature at a constant value against external influences and, in the event of changes in the setpoint value entry, e.g., in a chemical process, is to set the desired new temperature as rapidly as possible. The adaptive controller adapts itself automatically to any time-delayed processes having compensation without manual parametrization and without prior knowledge of the process. The controller is optimized during the first start-up after the control device has been installed in the control circuit, without it being necessary that the operator provide inputs for this purpose. As criterion for reaching a steady state after the setpoint value step-change, the speed of the controlled variable changes and the system deviation are evaluated and monitored when the latter are below a specifiable limiting value using a PI controller that is parametrized for an IT1 model. Subsequently, the process is identified on the basis of a more exact model, in particular a PT2 model. This model is therefore available after the first adjustment procedure and can, at this point, be retrieved for setting the controller.

The systems that come into question in temperature control processes can generally be controlled using simple PI or PID controllers, which demonstrate very good performance with respect to interference. In response to setpoint value changes, they can be supported, for example, by the following supplemental open-loop control measures: in the event of positive setpoint value step-changes beginning from a specifiable minimum value, a switchover in the structure takes place in which the integral-action component of the PI or the PID controller is switched off, i.e., a P or a PD controller is used; in the vicinity of the setpoint value, the integral-action component is again connected to the controller in a surge-free manner. For systems having very large delay times, in the event of setpoint value step-changes the following control measure can advantageously be applied: after the setpoint value step-change in an open-loop controlled operation, the manipulated variable that is required to be steady for the new setpoint value is output (read out) constantly until the setpoint value is nearly reached; subsequently, there is again a switchover to the PI or PID controller. Although this strategy is less than optimal with respect to time, it is not dependent on the precision of estimation in the system time constants, unlike the time-optimal open-loop control.

By using an IT1 model for identifying the process in an early phase of a first step-change response, the disadvantage of more exact models having compensation is avoided in that at this time point no dependable estimations regarding the steady process gain are yet possible. Rather, the maximum rate of rise is dependent on the ratio of the gain to the dominating time constant, for example, of a PT2 model. However, the IT1 model contains a reference to the delay time, which corresponds to the small time constant of a PT2 model, and a reference to the rate of rise. Thus, sufficient information is made available to parametrize a PI controller using an initially cautious setting, in which overshoots are substantially avoided and yet a sufficiently rapid control performance is obtained.

A control device for carrying out the method can be realized advantageously using an internal sequence control system having a plurality of different phases, which are differentiated in structures of the controller as well as in the models upon which the process identification is based. The control device can be implemented equally as a hardware circuit or as a processor having a program memory into which a suitable operating program has been loaded.

Physical models for temperature control systems can be designed on the basis of elementary PT1 models for the individual partial systems having their heat capacity and their corresponding heat transfers. On the whole, in this way PTn models are obtained of a usually low order. With real processes, it is seldom that more than three relevant time constants can be demonstrated. The typical gains of the processes, depending on the design of the heating system, are between 0.5 and 30, the time constants being between one and several thousand seconds. In general, temperature control systems are themselves not capable of overshoots, i.e., in the open closed-loop control circuit, they only have real pole positions and they usually have only insignificant dead times. Transmission zero positions, i.e., counter terms of a high order in the transmission function, arise if the output temperature is not picked off as the controlled variable at the end of the heat flow chain, e.g., in the case of an oven heated from inside, if the heat capacity of the insulation or of the oven wall plays a role. Zero positions can cause overshooting control behavior. Active cooling is often missing, and very many smaller negative temperature gradients can be observed, than positive. This effect can be clarified using a linear model, to which no negative manipulated variables are available. Nonlinearities of temperature control systems arise in some instances as a result of phase transitions, for example, of evaporation, or actuators having non-linear characteristic curves, e.g., valves.

Further advantages of the new control device in large measure correspond to those of the control device described in the German patent application described above. However, these advantages are attained in the new control device on the basis of significantly reduced computational work.

DETAILED DESCRIPTION

Figure 1:
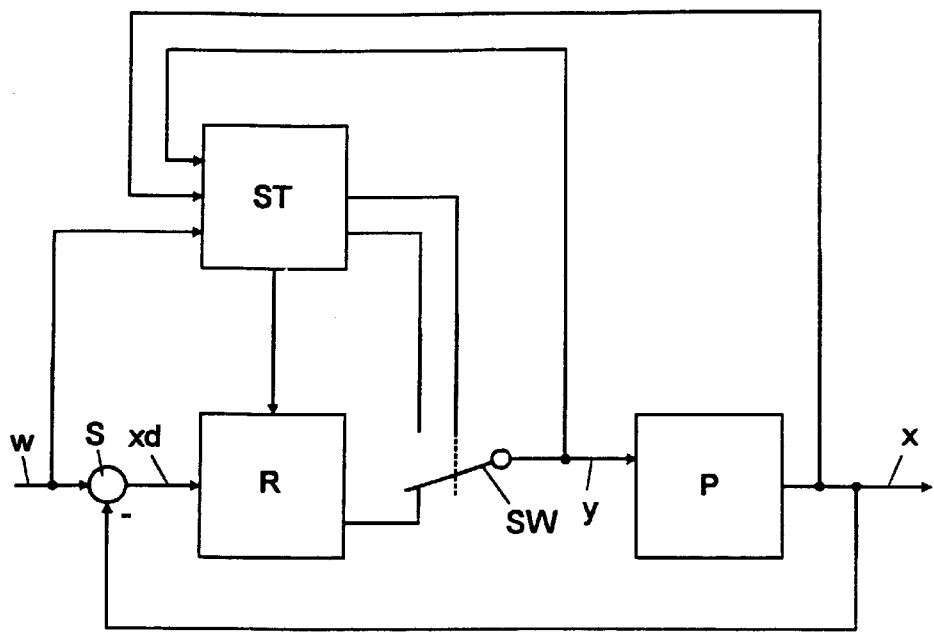
FIG. 1 shows a structure diagram of a control device.

As shown in FIG. 1, a control device closed-loop controls a controlled variable x, e.g., a temperature, which is measured in a process P. A subtractor member S compares measured controlled variable x with a setpoint value w and forms a system deviation signal xd, which is relayed to a linear controller R having an adjustable structure. In closed-loop controlled operation, controller R generates a manipulated variable y for process P. The closed-loop control circuit is thus closed. Reference variable w, controlled variable x, and manipulated variable y are fed to a control unit ST, which, to identify process P, calculates the parameters alternatively of an IT1 model or at least of a further, more exact model of the process having compensation, adjusting the structure and parameters of linear controller R as a function of the process model. In addition, control unit ST generates a switchover signal for a switch SW, using which a switchover can be effected between open-loop and closed-loop controlled operation.

FIG. 1 depicts a functional structure diagram of a control device. Of course, all the function blocks of the control device can be combined in one single electronic apparatus or be distributed in a decentralized manner among various apparatuses.

Figure 2:
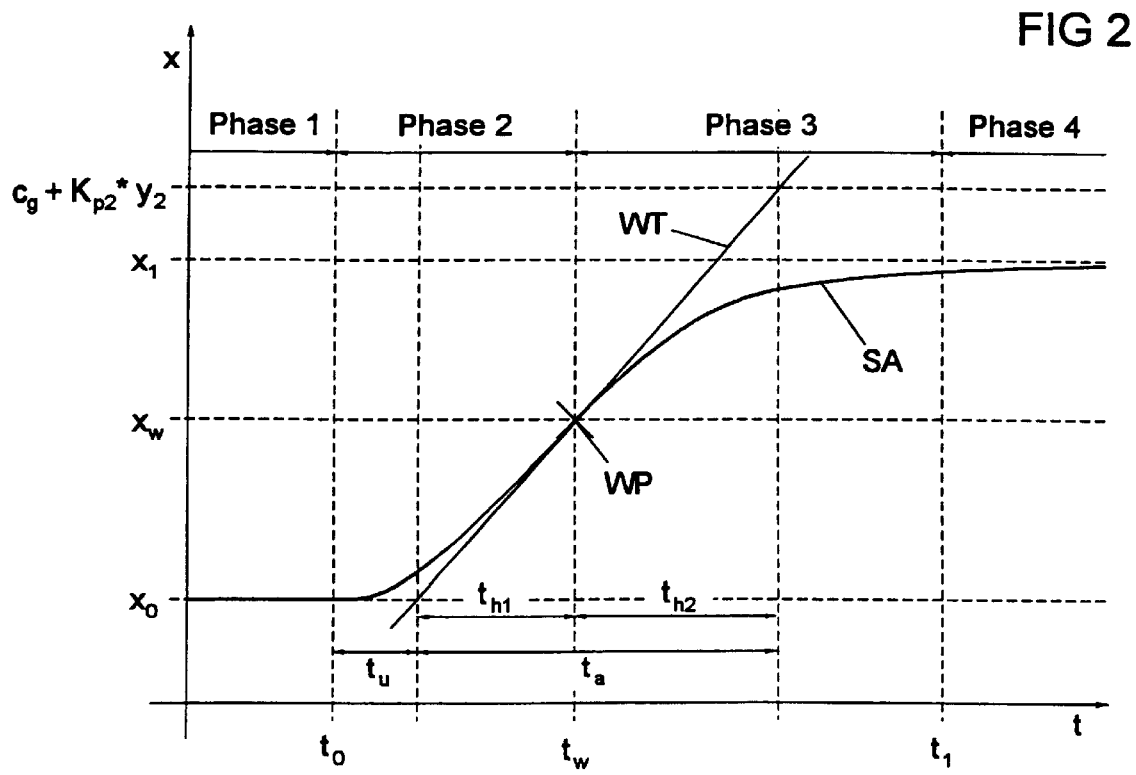
FIG. 2 shows a timing diagram of the principal curve of a step-change response.

As shown in FIG. 2, the functioning of the control device will be explained below. In phase 1, which extends until moment $t_0$, a manipulated variable y=0 is applied to process P. In a temperature control, this phase corresponds to the situation where in response to a shut-off of the heating system, constant manipulated variable y=0 is output to process P. Controlled variable x is in a first steady state $x=x_0=c_g$. The value $c_g$ is recorded as a direct component and is stored in memory.

As soon as an operator inputs a sufficiently large setpoint value step-change, Phase 2 is entered and maximum manipulated variable $y=y_2=y_{max}$ is applied to process P in an open-loop controlled operation through control unit ST. In a temperature control, this corresponds to full heating power. This manipulated variable is maintained until a turning point WP can be established in the characteristic curve of controlled variable x. A turning point is considered recognized if, in two sequential scanning steps, the rise of step-change response SA reverses for the first time. In order that the rise information not be invalidated by measuring noise, the measured values of controlled variable x are subjected to a low-pass filtering. If system deviation xd has decreased by a specified value between 50 and 80% of the step-change level, the value preferably amounting to 60%, then a turning point WP is assumed even in the absence of a reverse rise of the step-change response. On the basis of a tangent WT in turning point WP, which is also termed inflectional tangent, a delay time $t_u$, which is yielded from the point of intersection of inflectional tangent WT and straight line $x=x_0$, can be calculated as:

$$t_u = t_w - t_0 - t_{h1}, \quad t_{h1} = \frac{x_w - x_0}{dx_w/dt}$$

where $t_w$=moment of turning point WP, $t_0$=moment of setpoint value step-change, $t_{h1}$=an auxiliary variable, $x_w$=value of controlled variable x at turning point WP, $x_0$=value of controlled variable x at first steady state, and $$\frac{dx_w}{dt} = \text{rise of inflectional tangent } WT.$$

On the basis of this information, an IT1 process model is identified having the transmission function $$G(s) = \frac{K_i}{s(T_1 s + 1)}$$

whose gain $$K_i = \frac{dx_w/dt}{y_2}$$

and time constant $$T_1 = 2t_u$$

are set.

In Phase 3, which is initiated by the occurrence of turning point WP, a PI structure of linear controller R is set, and the parameters of the PI controller are determined on the basis of the IT1 model. Gain factor $K_{p1}$ of the PI controller is set in such a manner that a P controller for the closed-loop control of an IT1 system would have to be designed in the asymptomatic limiting case:

$$K_{p1} = \frac{1}{4T_1 K_1}.$$

In an initially cautious setting, in which overshoots are substantially avoided and a sufficiently rapid control behavior is achieved, reset time $T_{n1}$ of the PI controller is from 2 to 10 times the time constant $T_1$, preferably six times as great.

The switchover from open-loop to closed-loop controlled operation takes place without surge, by correspondingly initializing the integral-action component of a PI or PID controller in response to the switchover.

Since the IT1 model after a setpoint value step-change does not enter a new steady state, i.e., does not model a process without compensation, the process gain at first cannot be directly identified. However, to avoid problems arising from the large gain factors of the process having compensation controlled by the PI controller, the PI controller is only very cautiously designed due to the still incomplete information regarding process P. However, as soon as a steady state is achieved on the basis of this coarse control, gain $K_{p2}$ of a process model having compensation can be determined as:

$$K_{p2} = \frac{x_1 - x_0}{y_1 - y_0}$$

where $x_1$=value of controlled variable x in the second steady state, $x_0$=value of controlled variable x in the first steady state, $y_1$=value of manipulated variable y in the second steady state, and $y_0$=value of manipulated variable y in the first steady state.

As a criterion for attaining the second steady state, a test check can be run, for example, as to whether the system deviation is within a preselected limiting value or the rise of the controlled variable is smaller than a fraction of the rise of inflectional tangent WT.

On the basis of the knowledge of process gain $K_{p2}$, even information from inflectional tangent WT can now be substantially evaluated for determining a more exact model, for example, a PT2 or a PT1Tt model. The transmission function of a PT2 model in the Laplace range is:

$$G(s) = \frac{K_{p2}}{(T_2 s + 1) \cdot (T_3 s + 1)},$$

the transmission function of a PT1Tt model being:

$$G(s) = \frac{K_{p2}}{(T_4 s + 1)} e^{-T_t s}.$$

Rise time $t_a$ of the step-change response, which is yielded by the points of intersection of inflectional tangent WT and the straight line given $x=x_0$, which marks the first steady state, and the straight line given $x=c_g+K_{p2} \cdot y_2$, which marks a steady state which would be initiated by controlled variable x if manipulated variable $y_2$, applied to process P in the open-loop operation during Phase 2, were also to be maintained in closed-loop operation, is calculated as:

$$t_{h2} = \frac{K_{p2} \cdot y_2 + c_g - x_w}{d x_w / dt}$$

where $t_{h2}$=a second auxiliary variable, $y_2$=value of manipulated variable y that is applied during Phase 2 in the open-loop operation, and $c_g$=direct component, which ensues as a steady state if manipulated variable y=0 is applied to process P.

If rise time $t_a$ is larger than or equal to 10 times delay time $t_u$, a PT2 model is preferably used for process identification. For calculating time constants $T_2$ and $T_3$ of the PT2 model, a method is applied and further developed that is known from the book "Regelungstechnik I (Control Technology)" by Heinz Unbehauen, seventh edition, Vieweg Printing House, Braunschweig/Wiesbaden, 1992, pp. 363 through 367. Of consideration is the step-change response of the PT2 model having the ratio $$f=T_3/T_2$$

of two time constants $T_2$ and $T_3$. The step-change response reaches its turning point WP at the moment $$t_w = \frac{\ln f}{f-1} T_2.$$

From the characteristic curves of the step-change response, rise time $t_a$ is determined as $$t_a = \left(T_2 \left(\frac{T_3}{T_2}\right)\right)^{\frac{T_3}{T_3 - T_2}}$$

and delay time $t_u$ as $$t_u = \frac{T_3 T_2}{T_3 - T_2} \ln\left(\frac{T_3}{T_2}\right) - t_a + T_3 + T_2$$

From this, after the insertion of f, the following is obtained:

$$T_2 = t_a f^{\frac{-f}{f-1}}, \quad \frac{t_a}{t_u} = \frac{1}{f^{\frac{-f}{f-1}}\left(1 + f + \frac{f \ln f}{f-1}\right) - 1}.$$

In order that this non-linear system of equations be able to be solved for $T_2$ and f, the exponential functions must be approximated using linear approximations that yield good results at least for the practically relevant range 2<f<20. A suitable approximation is yielded by the two following equations having constants $p_1$ through $p_4$:

$$\frac{t_a}{t_u} \approx p_1 f + p_2,$$

$p_1 = 1.1919$, $p_2 = 8.0633$ $$T_2 \approx t_a \frac{1}{p_3 f + p_4},$$

$p_3 = 1.0722$, $p_4 = 2.0982$.

Using these equations, time constants $T_2$ and $T_3$ of the PT2 model are calculated as:

$$T_2 = t_a \cdot \frac{1}{\frac{p_3}{p_1}\left(\frac{t_a}{t_u} - p_2\right) + p_4}$$

$$T_3 = \frac{T_2}{p_1}\left(\frac{t_a}{t_u} - p_2\right).$$

Using this PT2 model, a PI or a PID controller is designed. The design, in the case of temperature systems, is preferably I-dominant, since the estimated values for the large time constants from the inflectional tangent are in any case only quite coarse. For calculating gain $K_{p4}$ of the controller, at first a gain $K_{p4}$ of a P controller is determined, which, in controlling a PT2 system using the P controller, would yield the asymptotic limiting case:

$$K_{p4} = \left(\frac{(T_2 + T_3)^2}{4 T_2 T_3} - 1\right)\frac{1}{K_{p2}}.$$

The zero position of the PI controller is located between the two system poles by the adjustment of its time constant $T_{n2}$:

$$T_{n2} = \frac{T_2 + T_3}{2}.$$

Gain $K_{p3}$ of the controller is set at a value $$1.5 \cdot K_{p4} < K_{p3} < 2.5 \cdot K_{p4},$$

preferably $$K_{p3} = 2 \cdot K_{p4}.$$

In a similar manner, the design of a PID controller having a delayed D component and the transmission function $$G_{PID}(s) = K_{p5}\left(1 + \frac{1}{T_{n3}s} + \frac{T_v s}{\frac{1}{v}T_v s + 1}\right)$$

can result. The first zero position of the PID controller is placed somewhat further to the right of the zero position of the PI controller:

$$T_{n2.PID} = 0.7 \cdot t_{n.PI}.$$

The second zero position is placed somewhat to the right of the rapid system pole:

$$T_{n2.PID} = 1.2 \cdot t_2.$$

Both time constants $T_{n3}$ and $T_v$ of the PID controller are selected such that precisely the two real zero positions $T_{n1.PID}$ and $T_{n2.PID}$ are yielded for the counter of transmission function $G_{PID}(S)$ of the controller:

$$T_{n3} = T_{n1.PID} + T_{n2.PID},$$

$$T_v = T_{n1.PID} \cdot T_{n2.PID} / T_{n3}.$$

As a desired value, derivative factor v is set at "5." The PID controller can now be operated on the basis of the strong gain $K_{p5} = 6 \cdot K_{p4}$.

In the event rise time $t_a$ is smaller than 10 times delay time $t_u$, it is advantageous that a PT1Tt model having time constant $T_4 = t_a$ and dead time $T_a = t_u$ be used for the modeling of process P. In response to this system behavior, a PI controller is preferably employed having reset time $T_{n4} = T_4$ and gain $$K_{P6} = \frac{T_4}{2T_t}.$$

One of the PI or PID controllers designed in this manner for a more exact model of system P is inserted into the closed-loop control circuit after Phase 3 and adjusts the process during Phase 4 to the second steady state. For this purpose, from control unit ST (FIG. 1), linear controller P is set at a PI or PID structure and is parametrized accordingly.

Thus, in an advantageous manner, the control device described manages without a genuine parameter estimator. In control unit ST, therefore, only a little memory and a slight computational performance are required, in contrast to the known control devices. Information that is retrieved in the process identification, however, is not sufficiently precise for designing a time-optimal open-loop control system. However, the new control device is persuasive from the first moment in comparison to the known control devices, in particular when cost savings are taken into account.

In response to a sufficiently large setpoint value step-change when the control device is first placed into operation, the manipulated variable in Phase 2 is set at its maximum value, i.e., $y_2 = y_{max}$. In response to further setpoint value step-changes in subsequent operation, an adaptation procedure can be carried out once again at the desire of the operator. For this purpose, from the steady state obtaining before the setpoint value set-change, Phase 2 is initiated on the basis of controlled variable $x = x_0$, and in response to a positive step-change a manipulated variable y having the value $$y_2 = 1.5 \cdot \frac{W - C_g}{K_{p2}}$$

is applied in a open-loop operation. Phases 2, 3, and 4 are run through in response to a renewed adaptation procedure in the manner described above. In accordance with the quality of the measured signals and the order of magnitude of the process gain, minimum step-change levels between 10 and 40% of the maximum step-change level for an adaptation desire are recommended.

In an advantageous manner, in the new control device and the new control method, no specific physical regularities of process P to be regulated are necessary. Therefore, use is possible, in principle, in pressure and flow control systems, in the case of controlled actuators and filling level control, preferably if they satisfy the following system-dynamic requirements:

1. A stable, time-delayed asymptotic transient response. Excluded from this are processes that demonstrate an oscillating or boundary-stable performance, as well as control systems without compensation.
2. A sufficiently linear behavior over a sufficiently large operational range. In this context, the term "sufficient" means that both for the identification as well as for the normal control operation, nonlinear effects may be disregarded. However, in the case of a self-adjusting controller in a nonlinear process, it is possible in an advantageous manner to identify the process once again in response to a change in the operating point, if the adaptation procedure is carried out in a small environment of the new operating point. If specific static nonlinearities, e.g., valve characteristic curves, are known in advance, it is in every case beneficial to compensate for them using a polygon tension and thus to linearize the process behavior.

3. Controllability of the process using a one-sided actuating signal, for example, from 0 to 100%. Thus are processes excluded, e.g., which for temperature control, in addition to an active heating system also require an active cooling system. However, this limitation can be circumvented by inserting a split-range output step behind (downstream of) the controller and parametrizing it such that the heating and cooling behaviors have a comparable dynamic.

4. Sufficient quality of the measuring signal with respect to the signal-to-interference ratio.

5. Delay times that are not too large. The adaptation is preferably designed for systems in which rise time $t_a$ is larger than 10 times delay time $t_u$. This is the case in most temperature control systems for which both a PI as well as a PID controller can be designed. In the event that rise time $t_a$ is only larger than three times delay time $t_u$, the linear controller having a PI structure is designed. If also this condition is not satisfied, then overshoots must be expected during the adaptation procedure.

What is claimed is:

1. A method for closed-loop control of a time delayed process having compensation, comprising:

a) after a setpoint value step-change from a first steady state, setting, in step fashion and in an open-loop operation, a manipulated variable to a first constant value to reduce a system deviation;

b) after one of: i) a turning point in a curve of a controlled variable is established, and ii) the system deviation is reduced by a preselected value between 50% and 80% of the step-change, identifying an IT1 model of the process;

c) in a first control adjustment, setting a PI structure and parameters of a linear controller, the parameters being set as a function of the IT1 model;

d) after the setting step, closed-loop controlling the process by the linear controller into a second steady state;

e) after the second steady state has been approximately reached, determining a more exact model having compensation; and f) setting the structure and the parameters of the linear control in a second control adjustment as a function of the more exact model having compensation.

2. The method according to claim 1, wherein the process is a process whose step response enters into a new steady-state condition.

3. The method according to claim 1, wherein the process is a temperature control process.

4. The method according to claim 1, wherein the more exact model having compensation is a model whose step response enters into a new steady-state condition.

5. The method according to claim 1, wherein the preselected value is 60%.

6. The method according to claim 1, wherein in the first control adjustment, a gain of the linear controller is set to $$K_{pI} = \frac{1}{4T_1 K_1}$$

where $K_{pi}$ is the gain of the linear controller, $K_i$ is a gain of the IT1 model, and $T_1$ is a time constant of the IT1 model, and wherein the a reset time $T_{n1}$ is set to $$T_{n1} = a \cdot T_1$$

where a is set to between 2 and 10.

7. The method according to claim 1, wherein the more exact model includes one of a PT2 model and a PT1Tt model, a gain of the more exact model being set to:

$$K_{p2} = \frac{x_1 - x_0}{y_1 - y_0}$$

where $K_{p2}$ is the gain of the more exact model, $x_1$ is a value of the controlled variable in the second steady state, $x_0$ is a value of the controlled variable in the first steady state, $Y_1$ is a value of the manipulated variable in the second steady state, and $y_0$ is a value of the manipulated variable in the first steady state; and wherein time constants of the PT2 model and a time constant for the PT1Tt model and a dead time for the PT1Tt model are established as a function of a step-change response of the process as measured in the open-loop controlled operation.

8. The method according to claim 1, further comprising:

after a further setpoint value step-change, setting the manipulated value in step fashion to a further constant value in an open-loop controlled operation to reduce the system deviation; and performing again steps b–f.

9. The method according to claim 6, wherein the value a is set to 6.

10. The method according to claim 7, wherein, in the open-loop controlled operation, a delay time $t_u$ and a rise time $t_a$ are determined as a function of the step-change response of the process, wherein if the rise time $t_a$ is one of larger to and equal to 10 times the delay time $t_u$, the PT2 model is used to identify the process, wherein $$T_2 = t_a \cdot \frac{1}{\frac{p_3}{p_1}\left(\frac{t_a}{t_u} - p_2\right) + p_4}$$

$$T_3 = \frac{T_2}{p_i}\left(\frac{t_a}{t_u} - p_2\right).$$

in which $T_2$ and $T_3$ are the time constants for the PT2 model, $p_1$ is a constant having a value of 1.1919, $P_2$ is a constant having a value of 8.0633, $p_3$ is a constant having a value of 1.0722, and $p_4$ is a constant having a value of 2.0982, and wherein if the rise time $t_a$ is smaller than 10 times the delay time $t_u$, the PT1Tt model is used to identify the process, the time constant of the PT1Tt model $T_4=t_a$, and the dead time of the PT1Tt model $T_t=t_u$.

11. A control device for closed-loop control of a time delayed process having compensation, comprising:

a linear controller having an adjustable structure and adjustable parameters, the linear controller generating a manipulated variable as a function of a system deviation;

a switch for selective feedforwarding to the process of one of: i) the manipulated variable generated by the linear controller in a closed-loop controlled operation, and ii) a specifiable manipulated variable in an open-loop controlled operation; and a control unit,
after a setpoint value step-change from a steady state, the control unit setting in step fashion at least a first constant value in an open-loop operation in order to reduce the system deviation,
after one of: i) a turning point in a curve of a controlled variable, and ii) after the system deviation has been reduced by a preselected value between 50 and 80% of the step-change, the control unit identifying an IT1 model of the process,
in a first control adjustment, the control unit setting the PI structure and parameters of the linear controller, the parameters of the linear controller being set as a function of the IT1 model,
after setting the PI structure and the parameters of the linear controller, the control unit closed-loop controlling the process into a second steady state,
after the second steady state has approximately been reached, the control unit determining a more exact model having compensation for the process, and
in a second control adjustment as a function of the more exact model having compensation, the control unit setting the structure and parameters of the linear controller.

12. The control device according to claim 11, wherein the more exact model is a model whose step response enters into a new steady-state condition.

* * * * *